United States Patent
Thrasher

[19]
[11] Patent Number: 6,042,273
[45] Date of Patent: Mar. 28, 2000

[54] ADJUSTABLE PRELOAD SPINDLE

[75] Inventor: Paul Christopher Thrasher, Grosse Ile, Mich.

[73] Assignees: Colonial Tool Group Inc.; Colonial Tool Sales & Service LLC, both of Windsor, Canada

[21] Appl. No.: 09/181,455

[22] Filed: Oct. 28, 1998

[51] Int. Cl.[7] ............................. F16C 33/66; F16C 23/06
[52] U.S. Cl. ..................... 384/517; 384/518; 384/519; 384/563; 384/583
[58] Field of Search .................................. 384/517, 518, 384/519, 563, 583

[56] References Cited

U.S. PATENT DOCUMENTS

| | | | |
|---|---|---|---|
| Re. 34,310 | 7/1993 | Duncan | 384/517 |
| 4,551,032 | 11/1985 | Mottershead | 384/517 |
| 4,915,514 | 4/1990 | Soderlund | 384/517 X |
| 5,202,937 | 4/1993 | Arvidsson | 384/563 |
| 5,386,630 | 2/1995 | Fox | 29/898.09 |
| 5,388,917 | 2/1995 | Hibi et al. | 384/517 |
| 5,411,388 | 5/1995 | Soderlund | 384/517 |
| 5,803,619 | 9/1998 | Tabata et al. | 384/518 |

*Primary Examiner*—Thomas R. Hannon
*Attorney, Agent, or Firm*—Reising, Ethington, Barnes, Kisselle, Learman & McCulloch, P.C.

[57] ABSTRACT

A machine tool spindle is associated with an adjustable preload mechanism for varying the preload on a bearing set for the spindle the mechanism comprising an annular piston that is selectively pressurized for loading spring(s) carried by a spring retainer that is engageable with the bearing set; and wherein the annular piston is held in an adjusted position by a position locating device including an adjustment member removably supported within a housing for the bearings and selectively engageable with the annular piston; the position locating device having a plurality of adjusted positions selectively engageable with the annular piston for fixing it in one of a plurality of positions for varying the compression of the spring(s) so as to maintain one of a plurality of preloads on the bearing set.

10 Claims, 3 Drawing Sheets

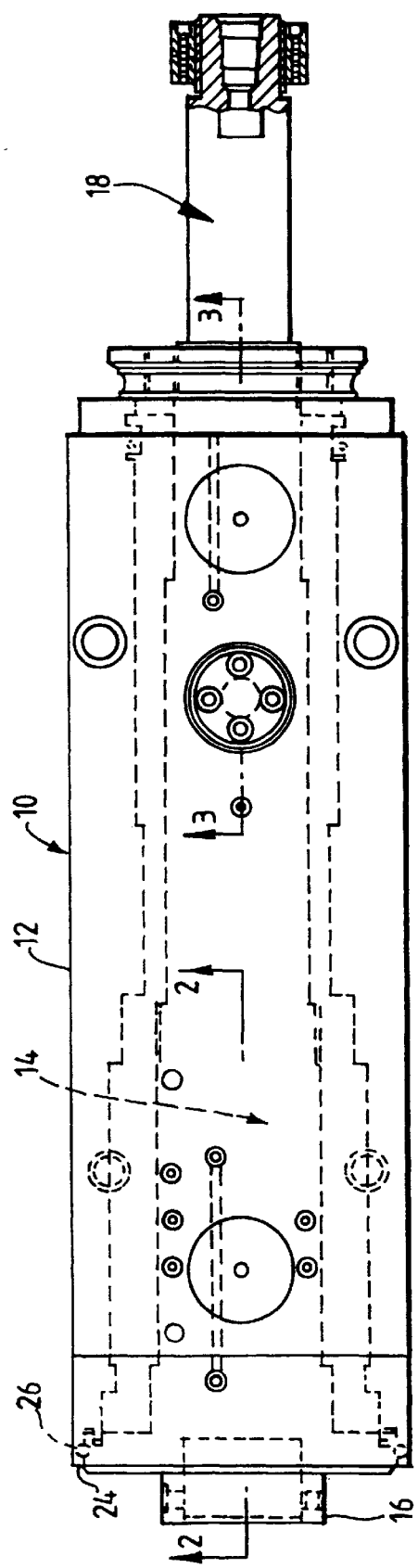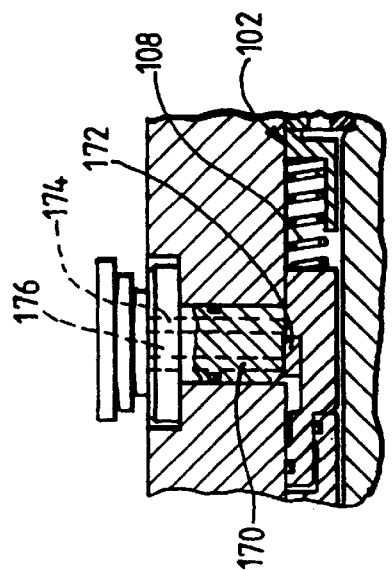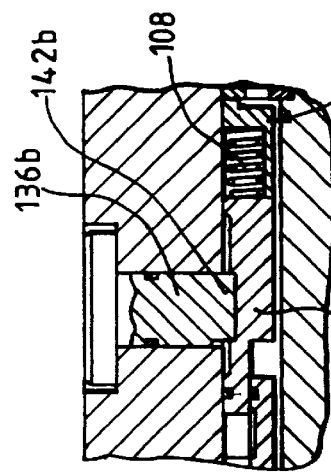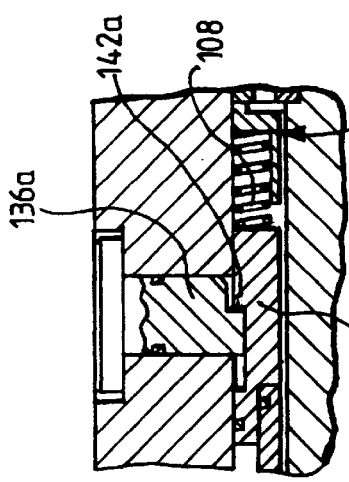

ADJUSTABLE PRELOAD SPINDLE

FIELD OF THE INVENTION

This invention relates to machine tool spindles and more particularly to such spindles that include a mechanism for varying the preloading of bearing sets for rotatably supporting a spindle with respect to a spindle housing.

BACKGROUND OF THE INVENTION

Various arrangements have been proposed to vary the preload acting on a machine tool spindle for adjusting the bearing loads to accommodate different kinds of machining conditions. Many manufacturers now request that motor driven spindles be able to be field adjusted to at least three different preload levels.

In one such system it is necessary to remove a bearing set and include a different sized spacer within the set and then reassembling the bearing set and holding it in place by a bearing retainer arrangement threadably held in place on the end of the spindle. While able to establish different preloads on the bearings of the spindle, such assembly and disassembly of the bearing set components can cause undesirable delays in set-up time and in turn around time when the machines are reset for different operations requiring different preloading levels in each of a plurality of spindles connected with the machining operation. An example of replacement of components to vary bearing set preload in a spindle assembly is shown in U.S. Pat. No. 5,386,630.

Accordingly, various arrangements have been suggested for adjusting the preload on the bearing sets without requiring removal and replacement of various components in the bearing sets. One approach utilizes a mechanical screw arrangement for varying spindle bearing preload as shown in U.S. Pat. No. 4,657,412. Other approaches vary the spindle bearing preload by application of hydraulic pressure in response to various sensed operating conditions of the spindle are shown in U.S. Pat. Nos. 4,551,032; 5,388,917 and RE34,310.

While suitable for their intended purpose the aforesaid spindle bearing preload arrangements all require sensing systems or a continuous application of hydraulic pressure to maintain the desired adjusted preload condition.

SUMMARY OF THE INVENTION

The present invention provides a machine tool spindle bearing preload arrangement wherein a number of spindles on a machining line can be preset without removing bearing sets supporting the spindle of each unit. Furthermore, the bearing preload adjustment can be accomplished without the need for elaborate sensing and control systems for hydraulic pressurization of a bearing set to accomplish bearing preload adjustment.

Accordingly, an object of the present invention is to provide an adjustable bearing preload mechanism for varying the preload on a bearing set for a spindle that is rotatably supported within a spindle housing by the bearing set wherein the adjustable bearing preload mechanism includes an annular piston slidably, sealingly supported on the I.D. of the spindle housing and an annular fluid supply plug sealing supported between the spindle housing and the O.D. of the spindle forming a pressurizable chamber between the annular piston and the fluid supply plug and wherein the chamber is supplied through a port for connecting a source of selectively directed pressure into the pressurizable chamber and a spring retainer is provided including a portion thereon engageable with the bearing set for imposing the force of a spring or springs interposed between the annular piston and the spring retainer on the bearing set and wherein the adjusted force of the springs varies in accordance with the position of the annular piston and one of a plurality of spring forces are selected by a position locating device including an adjustment member removably supported within the housing and selectively engageable with the annular piston when the annular piston is directed toward the spring by pressure build-up in the pressurizable chamber and wherein the position locating device has a plurality of adjusted positions when the adjustment member is located within the housing and is selectively engageable with the annular piston for fixing it in one of a plurality of positions for varying the compression of the spring or springs so as to maintain one of a plurality of preload levels on the bearing set.

A further object is to provide such an adjustable bearing pre load mechanism in which the position locating device includes a bore in the housing; the device further including a plug member positioned in and sealed with respect to the bore and including a fixed stop thereon; the fixed stop positioned within an annular groove formed in the O.D. of the annular piston; the annular groove having a surface thereon engaged with the fixed stop to define one of the plurality of locating positions.

Yet another object of the invention is to provide such an adjustable preload mechanism wherein the fixed stop is formed as a rectangular tip extending from the plug member.

Yet another object is to provide such an adjustable preload mechanism wherein the plug member is reoriented within the bore for locating the fixed stop member in different positions for engagement with the annular piston to change the axial position of the annular piston with respect to the spindle for varying the degree of compression of the spring member so as to adjust the preload on the bearing set to a high preload, a medium preload and a low preload.

Still another object of the invention is to provide such an adjustable shaft bearing preload mechanism in which the bearing set includes a pair of ball bearings; the pair of ball bearings having a separator therebetween at the inner races of the ball bearings; a bearing retainer threadably secured on the end of the spindle for holding the ball bearings in place; and the spring retainer has an annular axial extension thereon engaging the outer race of one of the pair of ball bearings for imposing the adjusted force of the preload spring on the pair of ball bearings.

These and other objects, advantages and features of the invention will become more apparent from the following detailed description of the invention when taken in conjunction with the accompanying drawings.

BRIEF DESCRIPTION OF THE DRAWINGS

FIG. 1 is a top elevational view of a machine tool spindle including the spindle bearing preload adjustment mechanism of the present invention;

FIG. 4 is a fragmentary sectional view showing a second stop position for the spindle bearing preload mechanism;

FIG. 5 is a fragmentary sectional view showing a third stop position for the spindle bearing preload mechanism; and FIG. 6 is a fragmentary sectional view of a second embodiment of the present invention.

DETAILED DESCRIPTION OF A PREFERRED EMBODIMENT

Figure 2:
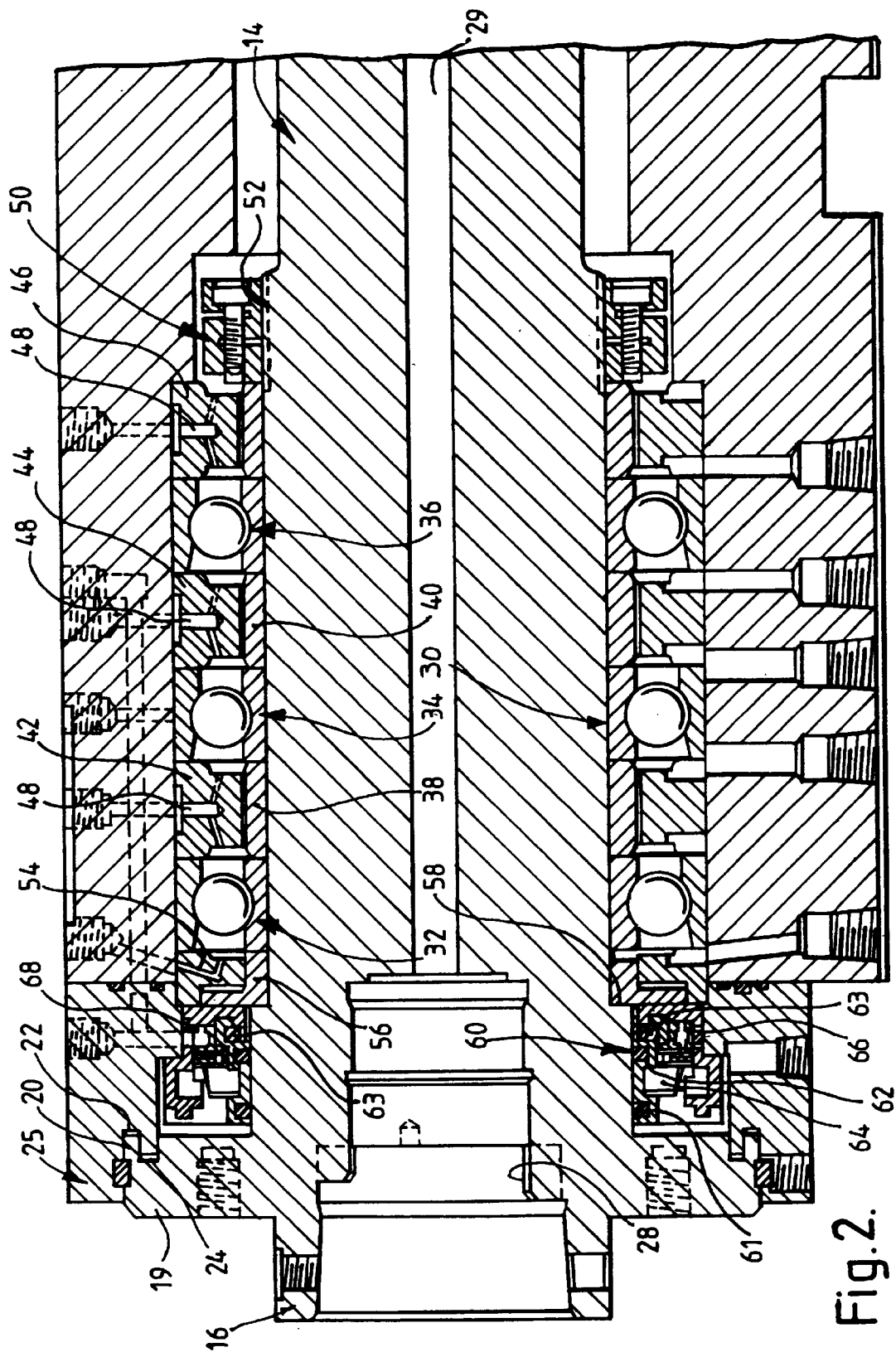
FIG. 2 is an enlarged sectional view taken along the line 2—2 in FIG. 1 looking in the direction of the arrows.

Referring now to FIG. 1 a top elevational view of a machine tool spindle 10 is shown that includes a housing 12 having a spindle 14 directed there through supported with respect to the housing by bearing sets to be described. The spindle has a nose 16 directed from one end of the housing 12 and a drive end 18 directed from the opposite end thereof.

The spindle nose 16, in the illustrated arrangement includes a enlarged diameter portion 19 that includes an annular flange 20 that is seated in an end groove 22 in the end face 24 of a housing end cover member 25 where it is located by a ring 26. A center bore 28 is provided in the spindle nose 14 adapted to receive the shank of a machine tool holder (not shown). In the illustrated embodiment, the shank includes a through hole 29 provided through the spindle 14 for receiving tool adjustment mechanism (not shown).

The spindle 14 is supported for rotation within the housing 12 at a point inboard of the spindle nose 16 by a bearing set 30 that is illustratively shown as three spaced roller bearings 32, 34, 36 having their inner races in engagement with annular spacers 38, 40 respectively. The outer races of each of the spaced roller bearings are engaged by spacer rings 42, 44, 46 that have passages 48 therein for directing lubricant to the bearings. In the illustrated arrangement, the bearing set 30 is held in place by a bearing retainer ring 50 threadably received on an external thread 52 on the O.D. of the spindle immediately inboard of the bearing set 30. The retainer ring 50 secures the bearings and spacers and two L-shaped annular filler members 54, 56 that are located between a shoulder 58 on the spindle 14 and the roller bearing 32 at the front end of the bearing set 30.

The bearing set 30 is sealed at the outboard end thereof by a seal assembly 60 located in a cavity 62 formed between the spindle nose 16 and the housing end cover member 25. The seal assembly 60 includes radially inwardly located annular O-rings 61, 62, 63; an annular radial faced seal 64 located within a seal carrier 66 press fit within the housing and sealed with respect thereto by an annular seal 68. This arrangement is merely representative of one seal arrangement for preventing the entrance of dirt, moisture and the like into the bearing set 30.

The preload on the bearing components of the bearing set 30 and an aft bearing set 70 for supporting the spindle 14 at the drive end 18 thereof in the past has included a process in which the front or rear bearing sets are removed from the spindle. Adjustment in preload on these bearings came from the axial variance between the inner spacers 40 and 76 versus the outer spacers 44 and 78. The bearing 72 in the prior art bearing set has its outer race grounded. To adjust preload, ring spacers 44 and/or 78 are selected and machined. To increase preload, spacers 44 and 78 would be reduced in width to add load. The bearings would be increased in width to reduce preload.

In accordance with the present invention, the bearing preload can be adjusted without removing the spindle or bearings from the housing and furthermore, the adjustment can be made while the spindle is located on a machine tool line wherein the housing of the spindle remains in place during the adjustment process.

More specifically, to accomplish such adjustment, the rear bearing set 70 includes a pair of ball bearings 72, 74 separated from each other at their inner races by an annular spacer 76 and separated from each other at their outer race by an annular ring 78 that includes lubricant passages 79. In this embodiment the bearing set 70 is held on the drive end 18 by a retainer ring 80 threadably connected to a threaded segment 82 of the drive end immediately outboard of a seal cover 84 that cooperates with a housing end cover 86 to enclose the outboard end of the drive end 18 as it is directed from the housing 12. More, particularly, the retainer ring 80 engages the seal cover 84 to force it against a spacer ring 88 that axially fixes or grounds the bearing set 70 with respect to the housing 12. The seal cover 84 further includes a U-shaped flange 90 thereon that is secured on an annular extension 92 on the housing end cover 86. A seal assembly 94 is located within a cavity formed between the spacer ring 88 and the housing end cover 86 for sealing against entry of moisture, dirt and the like at the drive end of the spindle. The seal assembly 94 is representatively shown as being sealed with respect to the spindle 14 by an O-ring 95; with respect to the spacer ring 88 by an O-ring 96; with respect to the housing end cover 86 by an O-ring 97. The end cover 86 is sealed with respect to an end bore 98 of the housing 12 by an O-ring seal 99 and with respect to the end face 101 of the housing 12 by an O-ring 103.

The present invention includes a preload adjustment mechanism 100 that includes a spring retainer 102 slidably supported on the O.D. portion 104 of the spindle 14 immediately inboard of the bearing set 70. The spring retainer 102 has an annular flange 106 thereof engaging the outer race of the ball bearing 72. A plurality of compression springs 108 (two shown in FIG. 2) are seated in guide holes 110 in the spring retainer 102. Each of the compression springs 108 engages an end face 112 on an annular piston 114. In the illustrated embodiment, there can be 8 to 32 springs (coil) depending on the size of the spindles. For wave and disc springs, the total number is 3–5 and the distance traveled by the annular piston 114 is reduced because of their sensitivity. The coil springs are provided at equidistantly circumferentially spaced points around the spring retainer 102. It should be understood that while a multi-spring arrangement is shown that the adjustment of spring load could also be accomplished by an arrangement where the illustrated coil springs are replaced by wave springs or disc spring types that will have a variable spring force depending upon the amount that the spring is compressed between the piston 114 and the bearing 72.

The piston 114 is slidably supported on the portion 104 and includes an annular flange 116 on its inboard end that is received in sliding sealing engagement with a bore 118 formed within a fluid supply fitting plug 120 that is seated in a press fit engagement with the housing 12 at a bore 121 therein is located with respect to the housing 12 at an internal shoulder 122 thereon. The plug 120 is sealed with respect to the housing by a pair of O-rings 124, 126. The plug 120 is sealed with respect to the piston 104 by an annular O-ring 127. The piston 114 is slidingly sealing engaged with the housing 12 by an O-ring 128. The aforesaid sealing arrangement combine to seal a cavity 130 formed between the plug 120 and the piston 114. The cavity 130 is communicated with a hydraulic or pneumatic inlet port 132 formed in the housing 12.

Figure 3:
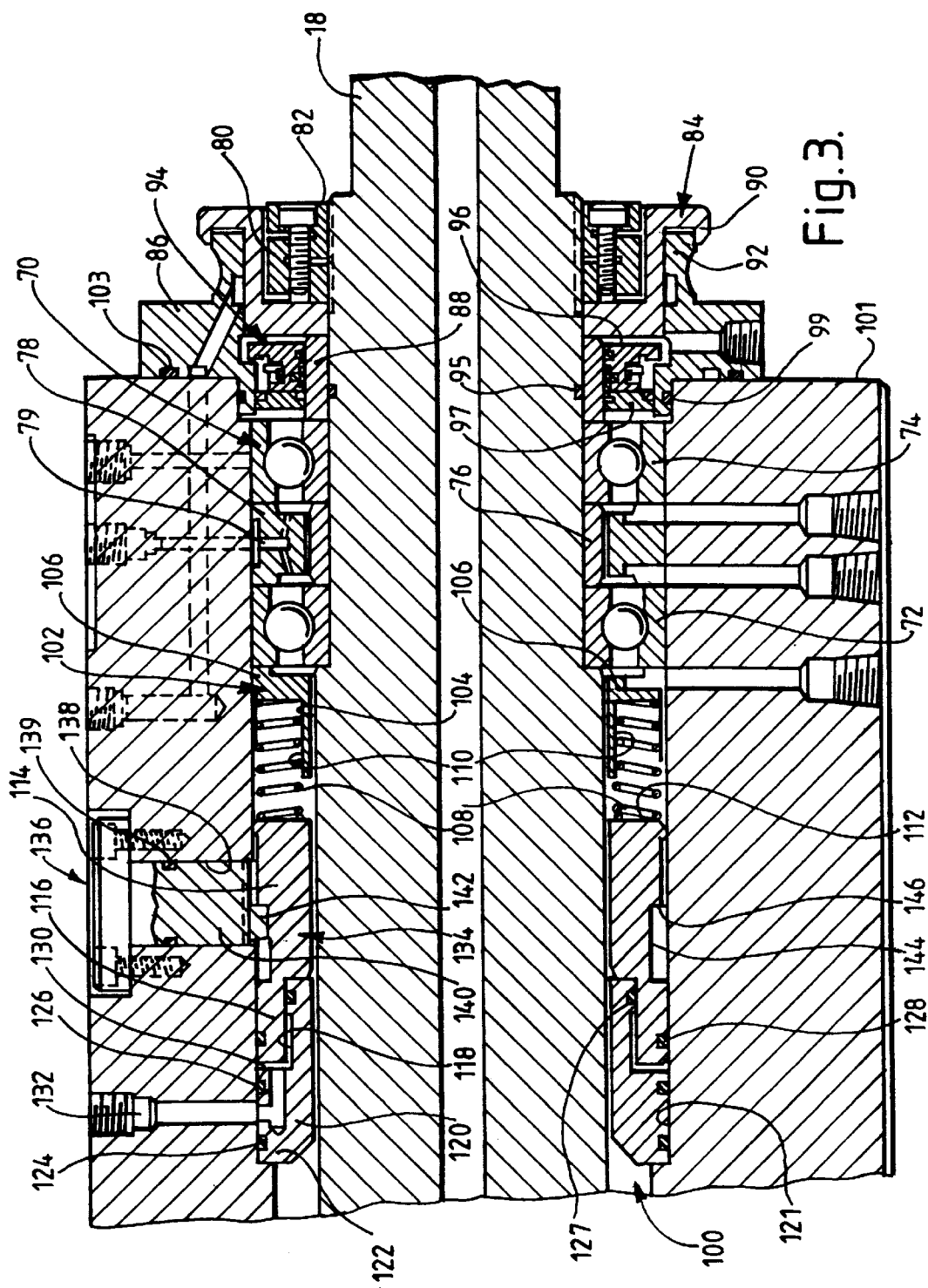
FIG. 3 is an enlarged sectional view taken along the line 2—2 in FIG. 1 looking in the direction of the arrows.

A position locating device 134 is provided including an adjustment member 136 removably supported within the housing 12 and selectively engageable with the annular piston 114 when the annular piston 114 is directed against the springs 108 by pressure build-up in the cavity 130 that constitutes a pressurizable chamber. The position locating device 134 has a plurality of selectable adjustment members. The adjustment member 136 in FIG. 3 establishes a low preload level as will be discussed. The adjustment member 136a in FIG. 4 establishes a medium preload level and the adjustment member 136b in FIG. 5 establishes a high preload level.

More particularly, the position locating device 134 includes a bore 138 in the housing and the adjustment member 136 includes a plug portion 140 positioned in and sealed with respect to the bore 138 by an O-ring 139, and including a fixed stop 142 thereon. The fixed stop 142 is positioned within an annular groove 144 formed in the O.D. of the annular piston 114. The annular groove 144 has a surface 146 thereon engaged with the fixed stop 142 to define one of the plurality of locating positions.

In the preferred embodiment, the fixed stop 142 is formed as an extension tip having a radius one-half the diameter of plug portion 140 and a side width offset on one side of the centerline of the plug. However, the shape of the fixed stop 142 is different for each of the adjustment members 136, 136a and 136b. As shown in FIG. 4, the adjustment member 136a has a fixed stop 142a that is of greater width than the fixed stop 142 so that the piston 134, when the pressure thereon is released will assume a position in which the springs 108 are more compressed than in FIG. 3 such that the preload on the bearing set will be above that of the low preload level imposed by the adjustment member 136 in FIG. 3. As shown in FIG. 5, the adjustment member 136b has a fixed stop 142b that is still larger than the fixed stop 142a so that the piston 134, when the pressure thereon is released will assume a position in which the springs 108 are more compressed than in FIG. 4 such that the preload on the bearing set will be above that of the medium preload level imposed by the adjustment member 136a in FIG. 4.

Another embodiment of the invention is shown in FIG. 6 wherein a single plug 170 is located in the housing 12. The plug 170 has a plurality of telescoped stops 172, 174 and 176 therein each having a different diameter and which are selectively position in or out of the piston groove 144. When the outer stop 172 is inserted, it produces a spring compression corresponding to that of stop 142b in FIG. 5. When the intermediate stop 174 is inserted it produces a spring compression corresponding to that of stop 142 in FIG. 3 and when the inner stop is inserted it produces a spring compression corresponding to that of the stop 142a in FIG. 4.

The preload changes will either cause the outer race segments of the ball bearings 72, 74 to increase or decrease the radial loading on the ball elements such that they will react on the spindle to increase or decrease the loading on the front bearing seat. As the spring force changes, the bearings will distribute the load proportionately. The outer races will deflect or move marginally as the load is increased or decreased. The inner races remain fixed and do not deflect. The movement of the outer races has a negligible effect on the positional accuracy of the face of the spindle.

The invention is equally suited for changing the preloading of tapered roller bearings and is applicable on arrangements wherein a lesser or greater number of bearings are included in either or both of the front and rear bearing sets for rotatably supporting a machine tool spindle with respect to its housing.

Obviously, many other modifications and variations of the present invention are possible in light of the above teachings. The present invention is adaptable to adjustment of preload in one or more of a plurality of spindles located in machine tool arrangements such as those used for boring engine blocks. Other machine tool arrangements including multiple spindle arrays that are desirably adjusted by the preload adjustment mechanism of the present invention include transfer lines, flexible machining centers and on all types of spindles including drill heads.

What is claimed is:

1. An adjustable preload mechanism for varying the preload on a bearing set for a spindle rotatably supported within a spindle housing by the bearing set comprising:

an annular piston slidably, sealingly supported on the I.D. of the spindle housing;

an annular fluid supply plug sealing supported between the spindle housing and the O.D. of the spindle forming a pressurizable chamber between the annular piston and the fluid supply plug;

a port for connecting a source of selectively directed pressure into the pressurizable chamber;

a spring retainer including a portion thereon engageable with the bearing set;

a spring member interposed between the annular piston and the spring retainer for imposing a preload force on the bearing set that varies in accordance with the position of the annular piston;

a position locating device including an adjustment member removably supported within the housing and insertable within the annular piston when the annular piston is directed toward the spring by pressure build-up in the pressurizable chamber;

the position locating device having a plurality of stops to change the adjusted positions of said annular piston when the adjustment member is located within the housing and selectively engageable with the annular piston for fixing it in one of a plurality of positions for varying the compression of the spring member so as to maintain one of a plurality of preload levels on the bearing set.

2. The adjustable preload mechanism of claim 1 further characterized by the position locating device including a bore in the housing; the device further including a plug member positioned in and sealed with respect to the bore and including a fixed stop thereon; the fixed stop positioned within an annular groove formed in the O.D. of the annular piston; the annular groove having a surface thereon engaged with the fixed stop to define one of the plurality of locating positions.

3. The adjustable preload mechanism of claim 2 further characterized by the fixed stop formed as a rectangular tip extending from the plug member.

4. The adjustable preload mechanism of claim 2 further characterized by more than one plug members; each of said more than one plug members being reoriented within the bore for locating more than one fixed stop member in different positions for engagement with the annular piston to change the axial position of the annular piston with respect to the spindle for varying the degree of compression of the spring member so as to adjust the preload on the bearing set to a high preload, a medium preload and a low preload.

5. The adjustable preload mechanism of claim 1 further characterized by the position locating device including a bore in the housing; the device further including a plug member positioned in and sealed with respect to the bore and including a retractable stop thereon; the retractable stop positioned within an annular groove formed in the O.D. of the annular piston; the annular groove having a surface thereon engaged with the retractable stop to define one of the plurality of locating positions.

6. The adjustable preload mechanism of claim 5 further characterized by said retractable stop including a plurality of telescoping stops being reoriented within the bore for locating each one of said plurality of telescoping stops in different positions for engagement with the annular piston to change the axial position of the annular piston with respect to the spindle for varying the degree of compression of the spring member so as to adjust the preload on the bearing set to a high preload, a medium preload and a low preload.

7. The adjustable preload mechanism of claim 1 further characterized by the bearing set including a pair of ball bearings; the pair of ball bearings having a separator therebetween at the inner races of the ball bearings; a bearing retainer threadably secured on the end of the spindle for holding the ball bearings in place; and the spring retainer having an annular axial extension thereon engaging the outer race of one of the pair of ball bearings for imposing the adjusted force of the preload spring on the pair of ball bearings.

8. The adjustable preload mechanism of claim 7 further characterized by more than one plug members; each of said more than one plug members being reoriented within the bore for locating more than one fixed stop member in different positions for engagement with the annular piston to change the axial position of the annular piston with respect to the spindle for varying the degree of compression of the spring member so as to adjust the preload on the bearing set to a high preload, a medium preload and a low preload.

9. The adjustable preload mechanism of claim 7 further characterized by the position locating device including a bore in the housing; the device further including a plug member positioned in and sealed with respect to the bore and including a retractable stop thereon; the retractable stop positioned within an annular groove formed in the O.D. of the annular piston; the annular groove having a surface thereon engaged with the retractable stop to define one of the plurality of locating positions.

10. The adjustable preload mechanism of claim 9 further characterized by said retractable stop including a plurality of telescoping stops being reoriented within the bore for locating each one of said plurality of telescoping stops in different positions for engagement with the annular piston to change the axial position of the annular piston with respect to the spindle for varying the degree of compression of the spring member so as to adjust the preload on the bearing set to a high preload, a medium preload and a low preload.

\* \* \* \* \*